United States Patent
Hawkins et al.

Patent Number: 5,239,880
Date of Patent: Aug. 31, 1993

[54] LOAD SHARING RIGHT ANGLE BEVEL GEAR DRIVE

[75] Inventors: John M. Hawkins, Greenwood; Douglas A. Wagner, Indianapolis; John B. Dunsil, Osgood, all of Ind.

[73] Assignee: General Motors Corporation, Detroit, Mich.

[21] Appl. No.: 947,619

[22] Filed: Sep. 21, 1992

[51] Int. Cl.⁵ .............................................. F16H 57/00
[52] U.S. Cl. ...................................... 74/406; 74/410; 74/423
[58] Field of Search .................. 74/406, 410, 417, 423

[56] References Cited

U.S. PATENT DOCUMENTS

| | | | |
|---|---|---|---|
| 1,351,470 | 8/1920 | Davis | 74/423 |
| 1,738,695 | 12/1929 | Dennison | 74/410 |
| 1,961,323 | 6/1934 | Almen | 74/7 |
| 2,230,899 | 2/1941 | McGrath | 74/424 |
| 2,315,409 | 3/1943 | Fedden et al. | 74/410 |
| 2,865,219 | 12/1958 | Allen | 74/410 |
| 2,910,882 | 11/1959 | Wellauer | 74/412 |
| 3,007,346 | 11/1961 | Demuth | 74/427 |
| 3,661,026 | 5/1972 | Gavioli | 74/385 |
| 4,270,408 | 6/1981 | Wagner | 74/410 X |
| 4,286,481 | 9/1981 | Miller | 74/410 X |
| 4,297,907 | 11/1981 | Bossler, Jr. et al. | 74/410 X |
| 4,311,435 | 1/1982 | Bergero | 74/410 X |
| 4,414,859 | 11/1983 | Hothoff | 74/417 |
| 4,437,355 | 3/1984 | Bordat | 74/385 |

*Primary Examiner*—Dirk Wright
*Attorney, Agent, or Firm*—Saul Schwartz

[57] ABSTRACT

A load sharing right angle bevel gear drive comprises a housing having a power bevel gear that meshes with two bevel gears that are mounted in the housing for rotation about a second axis that is perpendicular to the axis of rotation of the power bevel gear.

The power bever gear is mounted in a sleeve that automatically translates to equalize the power transmitted from the power bevel gear to the two bevel gears. The power bevel gear is axially retained in the sleeve by spaced rolling bearings and the sleeve translates on slides that retain the sleeve axially to counteract the axial components of the forces that automatically translate the sleeve.

In one embodiment, One bevel gear is a power output gear and the other bevel gear is an idler gear that also drives the power output gear through a fourth bevel gear. In another embodiment both bevel gears are power output gears. The sleeves of both embodiments preferably translate on slide pins via recirculating bearing balls to reduce friction. Both embodiments may employ hydraulic damping for the slide pins.

20 Claims, 2 Drawing Sheets

LOAD SHARING RIGHT ANGLE BEVEL GEAR DRIVE

FIELD OF THE INVENTION

This invention relates generally to gear drives and more specifically to load sharing right angle bevel gear drives that split the power from a power bevel gear between two meshing bevel gears that are disposed at right angles to the power bevel gear.

BACKGROUND OF THE INVENTION

It is already known from the U.S. Pat. No. 4,437,355 granted to Andre Bordat Mar. 20, 1984 to provide a bevel gear power transmitting gear train having a right angle bevel gear drive in which the power input gear is mounted so that it floats slightly in the directions perpendicular to its axis of rotation. This automatically balances the power that is transmitted directly to the power output gear with the power that is transmitted indirectly via a set of "loose" or idler gears.

The Bordat mechanism, however, has a major drawback in the way that the axial components of the forces that automatically balance the power transmitted directly and indirectly to the power output gear are suppressed so that the power input gear does not move axially More specifically, the Bordat mechanism employs an elongated swivel pin (20) that passes through the power input gear (2) and its integral stub shaft (1) and into the interior of the gear train where an integral bearing bushing at the inner end of the swivel pin (20) is journalled on a cross shaft (23) that is attached to the power output gear (3) and extends through the idler gear (5). The power input gear (2) and its integral stub shaft (1) are retained axially on the elongated swivel pin (20) by angular contact ball bearings (21) and (22) inside the stub shaft (1).

This swivel pin arrangement uses considerable space inside the gear train and consequently the Bordat mechanism is not suitable for many applications, such as those that require narrow gear spacing or concentric power shafts extending through the interior space of the gear train. The swivel pin arrangement also limits the torque and speed capabilities of the Bordat mechanism because small angular contact ball bearings to rotatably support and axially retain the power input gear (2) and its integral stub shaft (1) and because a plain journal bearing is used to axially retain the swivel pin (20). Consequently the Bordat mechanism is not well suited for high speed, high power applications such as gas turbine engine drives that use spiral bevel gears.

SUMMARY OF THE INVENTION

The object of this invention is to provide a load sharing right angle bevel gear drive of the type that has a bevel gear that automatically translates perpendicularly to it axis of rotation so that the power from a power bevel gear is split evenly between two driven bevel gears having an improved mechanism for retaining the automatically translated bevel gear against axial movement.

A feature of the invention is that the improved mechanism for retaining the automatically translated bevel gear against axial movement is located exteriorly of the bevel gear train and consequently an advantage of the improved load sharing right angle drive is that it can be used for applications where the space inside the bevel gear train is small and/or required for other components.

Another feature of the invention is that the improved mechanism for retaining the automatically translatable bevel gear against axial movement is located exteriorly of all bevel gears and their drive shafts and consequently another advantage of the improved load sharing right angle drive is that all the bevel gears can be rotatably supported by external bearings so that it can be used in high speed, high power applications that impose large bearing loads on the bevel gears.

Still another feature of the invention is that the improved mechanism for retaining the automatically translatable bevel gear against axial movement does not require a journal connection with any drive shaft and consequently yet another advantage of the improved load sharing right angle drive is that it can be used in high speed, high power applications that impose large thrust loads on the bevel gears such as those using spiral bevel gears.

BRIEF DESCRIPTION OF THE DRAWINGS

The above and other objects, features and advantages of the invention will become more apparent from the following description taken in conjunction with the accompanying drawings wherein like references refer to like parts and wherein:

Referring now to FIGS. 1 and 2 of the drawing, a load sharing right angle bevel gear drive (10) comprises a housing (12) for a bevel gear train indicated generally at (14) and an improved structure indicated generally indicated at (16) for supporting one of the bevel gears so that it translates in the housing (12) in a direction perpendicular to its axis of rotation while being axially retained.

Figure 1:
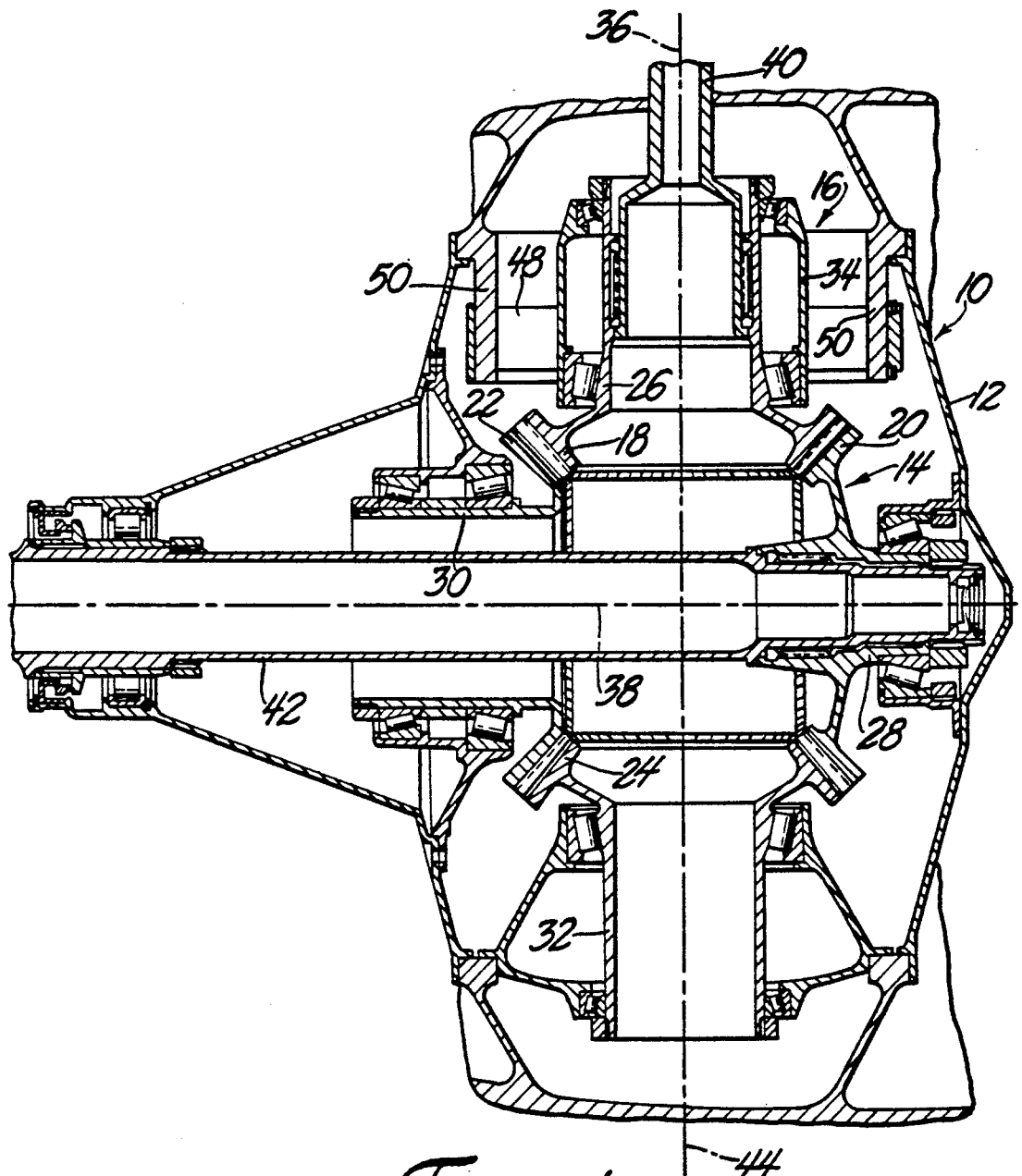
FIG. 1 is a longitudinal section of a load sharing right angle drive in accordance with the invention.

The bevel gear train (14) consists of four intermeshing bevel gears (18, 20, 22 and 24) that are supported for rotation inside the housing (12) by means of integral hollow stub shafts (26, 28, 30 and 32). The bevel gear (18) is a power bevel gear and its integral hollow stub shaft (26) is rotatably mounted in a translatable sleeve (34) for rotation about a vertical axis (36), as viewed in FIG. 1, by spaced rolling bearings of the tapered roller type. The sleeve (34) is part of the improved structure that is generally indicated at (16) and that will be explained in detail later.

The power bevel gear (18) meshes with bevel gears (20 and 22). Bevel gear (20) is also a power bevel gear and its integral hollow stub shaft (28) is rotatably mounted in the housing (12) for rotation about a horizontal axis (38), as viewed in FIG. 1, that is perpendicular to the rotational axis (36) of the power bevel gear (18). The meshing power bevel gears (18 and 20) form right angle drive and their respective hollow stub shafts (26 and 28) are spline connected to drive shafts (40) and (42) respectively.

The bevel gear (22) on the other hand is an idler bevel gear. It is concentrically arranged with the power bevel gear (20) and its integral hollow stub shaft (30) is rotatably mounted in a support of the housing (12) by spaced rolling bearings for rotation about the horizontal axis (38). The drive shaft (42) extends through the idler bevel gear (22) and hollow stub shaft (30). The power bevel gear (20) is rotatably supported in the housing (12) by means a tapered roller bearing supporting the hollow stub shaft (28) adjacent the power bevel gear (20) and a roller bearing supporting the drive shaft (42) on the other side of the idler bevel gear (22).

The bevel gear (24) is an idler gear that meshes with the idler bevel gear (22) and with the power bevel gear (20). The hollow stub shaft (32) of the idler bevel gear (24) is rotatably mounted in a support of the housing (12) so that the idler bevel gear (24) rotates about a vertical axis (44) that is perpendicular to the horizontal axis (38). The vertical axes (36) and (44) are parallel to each other and may coincide depending on the automatically adjusted position of the sleeve (34).

Figure 2:
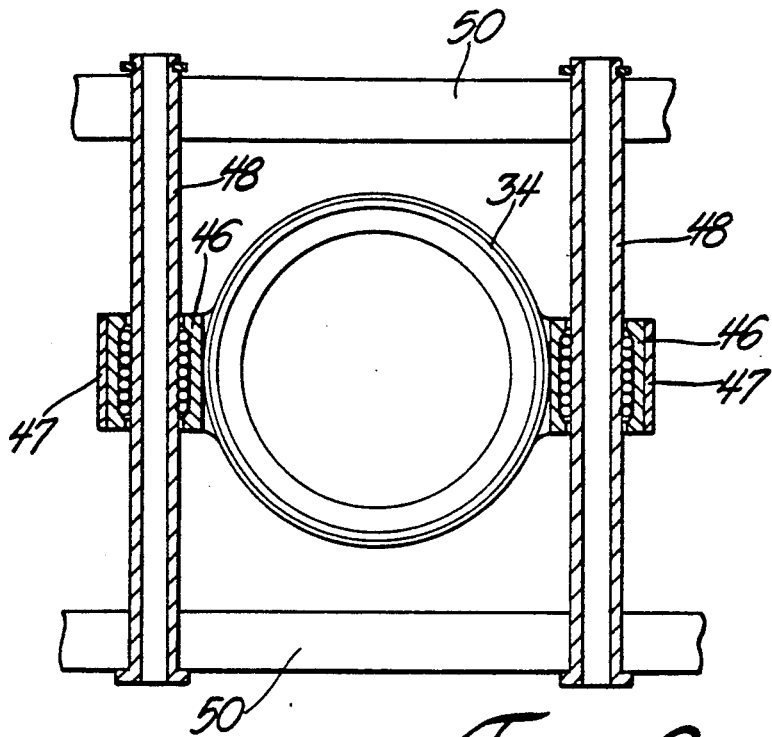
FIG. 2 is a section taken substantially along the line 2—2 of FIG. 1 looking in the direction of the arrows.

As indicated above, the sleeve (34) is part of the improved structure that is generally indicated at (16) for supporting the power bevel gear (18) so that it translates in a direction perpendicular to axis (36), i.e., horizontally in FIG. 1, while being retained axially, i.e., vertically in FIG. 1. The sleeve (34) is located externally of the bevel gear train (14) consisting of the intermeshing bevel gears (18, 20, 22 and 24) and it is mounted for translation in the housing (12) in a radial direction perpendicular to the axis (36) about which the power bevel gear (18) rotates by structure that is also located entirely externally of the bevel gear train (14). More particularly, the sleeve (34) is translatably mounted in the housing (12) by two slides that comprise a pair of journals (46) and a pair of cooperating hollow slide pins (48). The journals (46) are connected to the sleeve (34) diametrically opposite each other by sleeve ear (47) that extend radially outwardly as shown in FIG. 2 and the cooperating slide pins (48) have their ends anchored in support walls (50) of the housing (12) as shown in FIGS. 1 and 2. The journals (46) preferably include arrays of recirculating bearing balls as shown in FIG. 2 so that friction is reduced and the sleeve (34) slides on the pins (48) easily.

When power is transmitted by the power bevel gear (18), the power is split between a direct path to the power bevel gear (20) and an indirect path to the power bevel gear (20) via the idler bevel gears (22) and (24). When this occurs, the horizontal position of the sleeve (34), as viewed in FIG. 1, is automatically adjusted so that the power transmitted from the power bevel gear (18) directly to the power bevel gear (20) and the power transmitted indirectly from the power bevel gear (18) to the power bevel gear (20) via the idler bevel gears (22) and (24) are equalized as explained in the Bordat patent which is discussed in the introductory portion of this patent specification and which is incorporated in this patent specification by reference.

The forces that automatically adjust the position of the power bevel gear (18) and the sleeve (34) have axial components that act to push the power bevel gear (18) away from the bevel gears (20) and (22) and thus axial movement of the power bevel gear (18) and the sleeve (34) must be prevented. The improved structure indicated generally at 14 also retains the power bevel gear (18) axially. More specifically, the power bevel gear (18) is rotatably mounted in the sleeve (34) by means of spaced rolling bearings of the angular contact type, that are disposed between the stub shaft (26) and the sleeve (34) and that prevent axial movement of the power bevel gear (18) with respect to the sleeve (34). The sleeve (34) itself is retained in the axial direction by the journals (46) and slide pins (48) which limit movement of the sleeve (34) to translation in the horizontal direction. Thus the invention has a mechanism for retaining the automatically translatable bevel gear (18) against axial movement that is located entirely externally of the bevel gear train consisting of the bevel gears (18, 20, 22 and 24). This mechanism is also detached and spaced from the drive shaft (24) unlike that of the Bordat patent discussed above.

Figure 3:
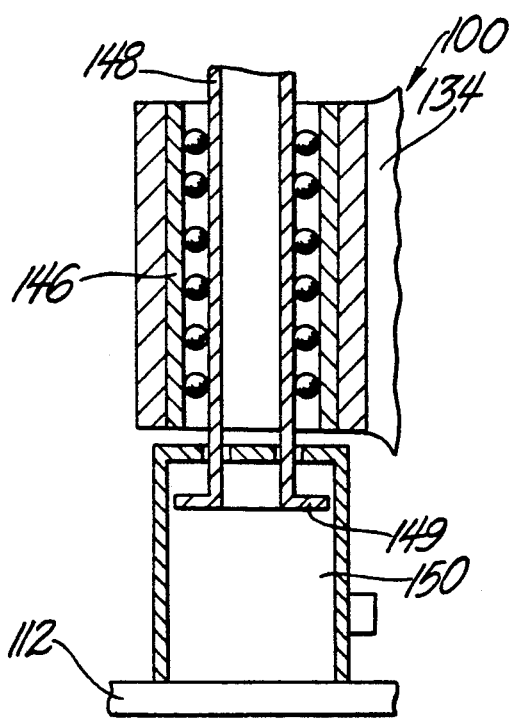
FIG. 3 is fragmentary section of an another embodiment of the invention.

Another embodiment of the invention is shown in FIG. 3. The right angle drive (100) of this embodiment provides hydraulic damping for the translatable sleeve (134). This is accomplished by using modified hollow slide pins (148) for the journals (146) that incorporate a flange (149) at on end. These flanges (149) are disposed in oil filled chambers (150) of a modified housing (112). These hydraulic dampers prevent vibration instabilities when the sleeve 134 automatically adjusts back and forth on the slide pins (148) but the right angle drive (100) is otherwise the same as the right angle drive (10).

Figure 4:
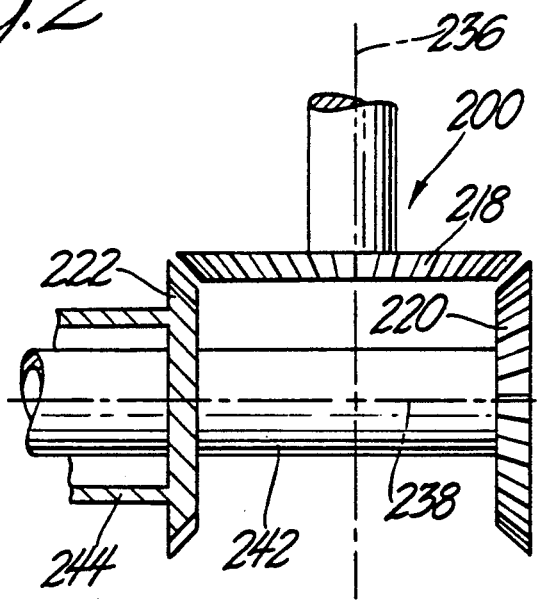
FIG. 4 is a fragmentary schematic view of yet another embodiment of the invention.

A further embodiment of the invention is illustrated in the right angle bevel gear drive (200) shown schematically in FIG. 4. This further embodiment has a different bevel gear train that comprises a power bevel gear (218) that rotates on a vertical axis (236) and meshes with two power bevel gears (220) and (222) that rotate on a horizontal axis (238) and that are drive connected to drive shafts (238) and (244) respectively. The right angle drive (200) is otherwise the same as the right angle drive (10) shown in FIGS. 1 and 2. Thus the power bevel gear (218) is likewise rotatably mounted in a sleeve that automatically translates in a radial direction perpendicular to the axis (236) to equalize the power that is transmitted from the power bevel gear (218) to the respective power bevel gears (220) and (222). The right angle drive (200) may also be modified to provide hydraulic damping as shown in FIG. 3.

The invention has been described in an illustrative manner, and it is to be understood that the terminology which has been used is intended to be in the nature of words of description rather than of limitation.

Obviously, many other modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A load sharing right angle bevel gear drive comprising:

a housing, a power bevel gear that is rotatably mounted in the housing for rotation about a first axis, a second bevel gear that meshes with the first power gear and that is rotatably mounted in the housing for rotation about a second axis that is perpendicular to the first axis, a third bevel gear that meshes with the first power bevel gear and that is rotatably mounted in the housing for rotation about a third axis that is perpendicular to the first axis, means for mounting one of the bevel gears for translation in the housing in a radial direction perpendicular to its axis of rotation to equalize the power transmitted from the power bevel gear to the second power gear with the power transmitted from the power bevel gear to the third bevel gear, and means located externally of the bevel gears for preventing axial movement of the power bevel gear.

2. A load sharing right angle bevel gear drive comprising:

a housing, a first power bevel gear that is rotatably mounted in the housing for rotation about a first axis, a second power bevel gear that meshes with the first power bevel gear and that is rotatably mounted in the housing for rotation about a second axis that is perpendicular to the first axis, a first idler bevel gear that meshes with the first power bevel gear and that is rotatably mounted in the housing for rotation about third axis that is perpendicular to the first axis, a second idler gear that meshes with the first idler bevel gear and with the second power bevel gear and that is rotatably mounted in the housing for rotation about a fourth axis that is perpendicular to the third axis, one of the bevel gears being rotatably mounted in the housing by means of a sleeve that is located externally of the bevel gears and that is mounted for translation in the housing in a radial direction perpendicular to the axis of rotation of the one bevel gear to equalize the power transmitted directly from one power bevel gear to the other power gear with the power transmitted indirectly from one power bevel gear to the other power bevel gear via the idler bevel gears, and means located externally of the bevel gears including the sleeve for preventing axial movement of the one bevel gear that is translatably mounted in the housing to equalize power transmission.

3. The load sharing right angle bevel gear drive as defined in claim 2 wherein the one bevel gear is rotatably mounted by means of spaced rolling bearings between the sleeve and a stub shaft of the one bevel gear that prevent axial movement of the one bevel gear with respect to the sleeve.

4. The load sharing right angle bevel gear drive as defined in claim 2 wherein the sleeve is mounted for translation in the housing by means of slides comprising a pair of journals connected to the sleeve diametrically opposite each other and a pair of cooperating slide pins that are supported in the housing at their ends.

5. The load sharing right angle bevel gear drive as defined in claim 4 wherein the slide pins are fixedly supported in the housing at their ends.

6. The load sharing right angle bevel gear drive as defined in claim 4 wherein the slide pins are supported in the housing at their ends by hydraulic dampers that include plates at the ends of the slide pins.

7. A load sharing right angle bevel gear drive comprising:

a housing having a sleeve mounted for translation in the housing, a first power bevel gear having a stub shaft that is rotatably mounted in the sleeve for rotation about a first axis, a second power bevel gear that meshes with the first power bevel gear and that is rotatably mounted in the housing for rotation about a second axis that is perpendicular to the first axis, a first idler bevel gear that meshes with the first power bevel gear and that is rotatably mounted in the housing for rotation about the second axis, a second idler gear that meshes with the first idler bevel gear and with the second power bevel gear and that is rotatably mounted in the housing for rotation about a third axis that is perpendicular to the second axis, the sleeve being located externally of the bevel gears and being mounted for translation in the housing in a radial direction perpendicular to the first axis about which the first power bevel gear rotates to equalize the power transmitted directly from the first power bevel gear to the second power gear with the power transmitted indirectly from the first power bevel gear to the second power bevel gear via the idler bevel gears, the first power bevel gear being rotatably mounted by means of spaced rolling bearings in the sleeve that prevent axial movement of the first power bevel gear with respect to the sleeve and means located externally of the bevel gears for preventing axial movement of the sleeve and first power bevel gear.

8. The load sharing right angle bevel gear drive as defined in claim 7 wherein the sleeve is mounted for translation in the housing by mean of slides comprising a pair of diametrically opposed journals connected to the sleeve and a pair of cooperating slide pins having ends that are supported in the housing.

9. The load sharing right angle bevel gear drive as defined in claim 8 wherein the slide pins are fixedly supported in the housing at their ends.

10. The load sharing right angle bevel gear drive as defined in claim 8 wherein the slide pins are supported in the housing at their ends by hydraulic dampers that include plates at the ends of the slide pins.

11. The load sharing right angle bevel gear drive as defined in claim 7 wherein the second power bevel gear is drive connected to a drive shaft that extends through the first idler bevel gear and wherein the means located externally of the bevel gears for preventing axial movement of the sleeve and first power bevel gear is detached and spaced from the drive shaft.

12. A load sharing right angle bevel gear drive comprising:

a housing having a sleeve mounted for translation in the housing, a first power bevel gear having a stub shaft that is rotatably mounted in the sleeve for rotation about a first axis, a second power bevel gear that meshes with the first power bevel gear and that is rotatably mounted in the housing for rotation about a second axis that is perpendicular to the first axis, a third bevel gear that meshes with the first power bevel gear and that is rotatably mounted in the housing for rotation about the second axis, the sleeve being located externally of the bevel gears and being mounted for translation in the housing in a radial direction perpendicular to the first axis about which the first power bevel gear rotates to equalize the power transmitted from the first power bevel gear to the second power gear with the power transmitted from the first power bevel gear to the third bevel gear, the first power bevel gear being rotatably mounted by means of spaced rolling bearings in the sleeve that prevent axial movement of the first power bevel gear with respect to the sleeve and means located externally of the bevel gear for preventing axial movement of the sleeve an first power bevel gear.

13. The load sharing right angle bevel gear drive as defined in claim 12 wherein the sleeve is mounted for translation in the housing by means of slides comprising a pair of diametrically opposed journals connected to the sleeve and a pair of cooperating slide pins having ends that are supported in the housing.

14. The load sharing right angle bevel gear drive as defined in claim 13 wherein the slide pins are fixedly supported in the housing at their ends.

15. The load sharing right angle bevel gear drive as defined in claim 13 wherein the slide pins are supported in the housing at their ends by hydraulic dampers that include plates at the ends of the slide pins.

16. The load sharing right angle bevel gear drive as defined in claim 12 wherein the second power bevel gear is drive connected to a drive shaft that extends through the first idler bevel gear and wherein the means located externally of the bevel gears for preventing axial movement of the sleeve and first power bevel gear is detached and spaced from the drive shaft.

17. The load sharing right angle bevel gear drive as defined in claim 12 wherein the third bevel gear is a power gear that is drive connected to a drive shaft.

18. The load sharing right angle bevel gear drive as defined in claim 16 wherein the third bevel gear is a power gear that is drive connected to a drive shaft.

19. The load sharing right angle bevel gear drive as defined in claim 12 wherein the third bevel gear is an idler bevel gear that meshes with another idler bevel gear that is mounted in the housing for rotation about an axis that is parallel to the axis of rotation of the first power bevel gear and wherein the said another idler gear meshes with the second power bevel gear.

20. The load sharing right angle bevel gear drive as defined in claim 16 wherein the third bevel gear is an idler bevel gear that meshes with another idler bevel gear that is mounted in the housing for rotation about an axis that is parallel to the axis of rotation of the first power bevel gear and wherein the said another idler gear meshes with the second power bevel gear.

* * * * *